United States Patent Office 3,616,541
Patented Nov. 2, 1971

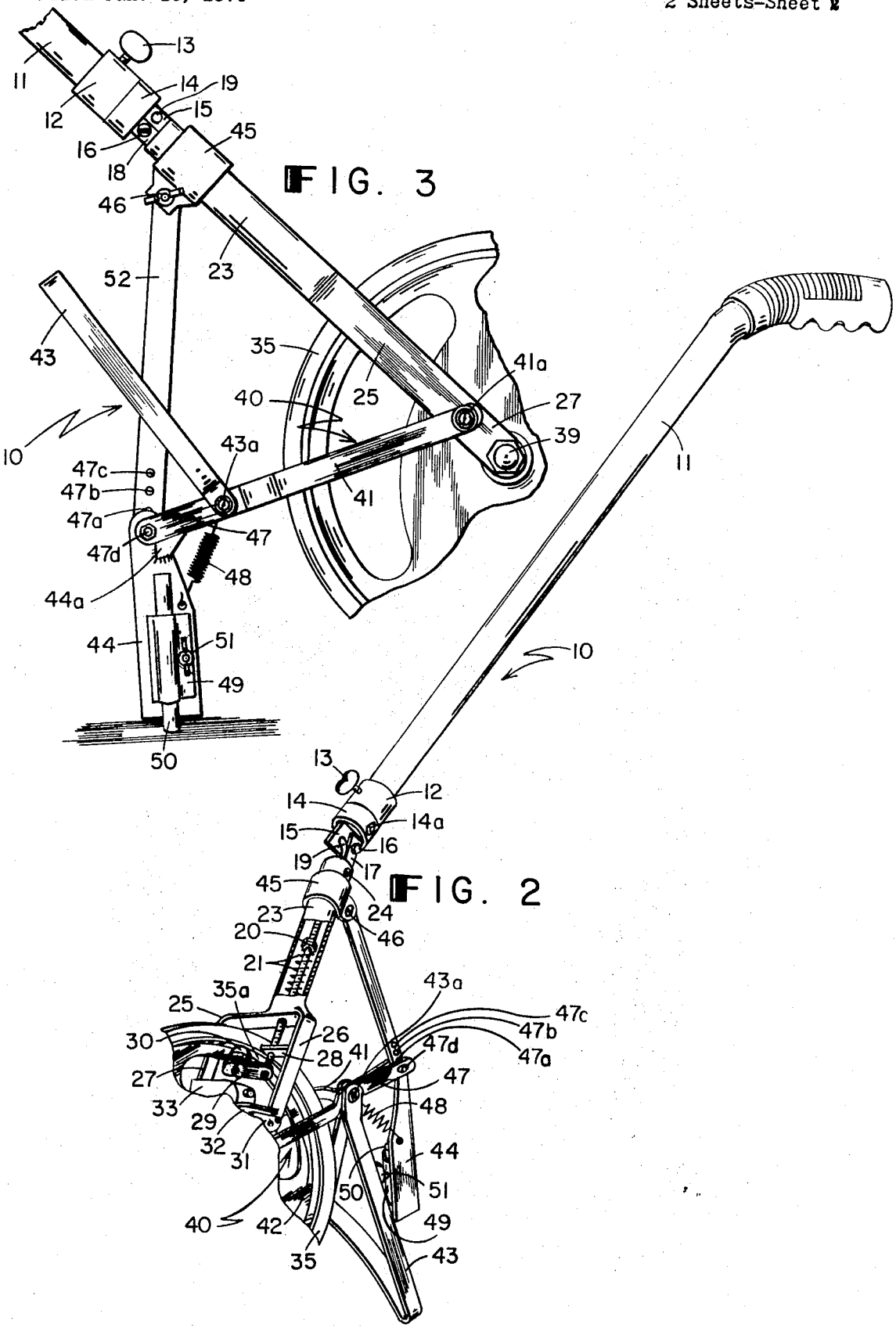

3,616,541
MEASURING WHEEL
Charles A. Crayton, 455 North St.,
Randolph, Mass. 02368
Filed Jan. 15, 1970, Ser. No. 3,177
Int. Cl. A47j 43/28
U.S. Cl. 33—141 R    7 Claims

ABSTRACT OF THE DISCLOSURE

A measuring wheel for measuring and marking off long distances, comprising a wheel, counter and handle. A brake is provided which is operated by pivoting the upper portion of the handle.

BACKGROUND OF INVENTION

This invention relates to a wheel with a handle and counter which can be used by a person walking along a designated path to accurately measure and mark off long distances. Such a measuring wheel is useful in the laying out of utiilties and highways and also for laying out courses for athletic events such as track.

BRIEF DESCRIPTION OF DRAWINGS

FIG. 2 is a partial oblique view with the handle in bent position.

FIG. 3 is a partial side view.

SUMMARY OF INVENTION

Figure 1:
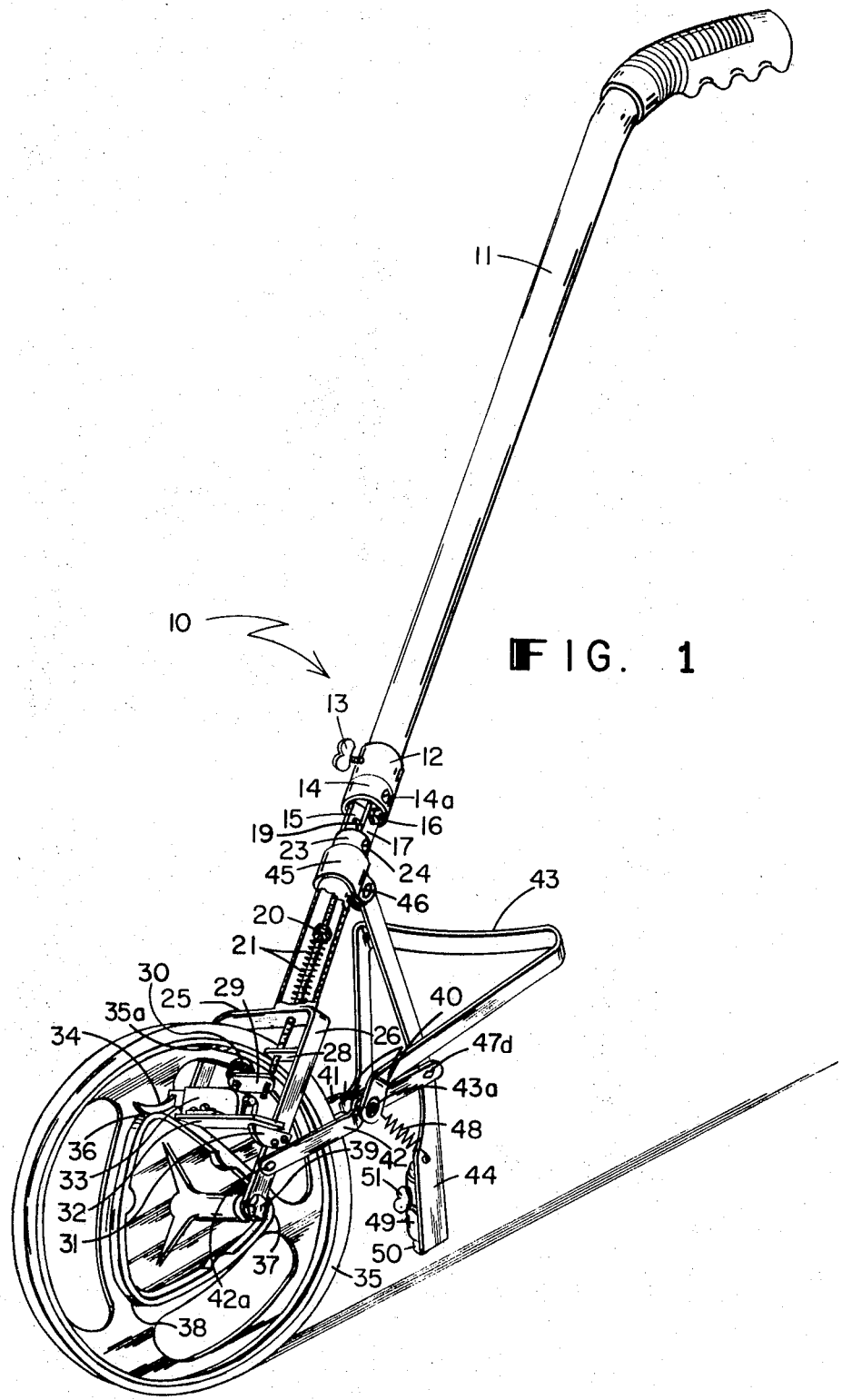
FIG. 1 is an oblique view of the measuring wheel of this invention with partial cutaway and with the handle in normal straight condition.

The measuring wheel of this invention comprises generally a wheel, a yoke and a handle divided into an elongated upper portion pivotally connected to a relatively short lower portion. The yoke supports a digital counter whose tongue is engageable with a cam surface on the side of the wheel. Also supported by the yoke is a brake whose shoe is engageable with the rim of the wheel. The brake shoe is actuable by a brake rod which extends longitudinally to a pivotal connection at the lower end of the upper handle portion.

The pivotally connected upper handle portion is arranged to move from a position straight or in line with the lower portion to a position bent somewhat downward. In straight position the brake shoe is disengaged while in downward or bent position, the brake shoe is engaged.

The brake action is accomplished by having the brake rod rise when the handle is bent and fall when the handle is raised to straight position. In one embodiment, as illustrated below, the brake rod is pivotally connected to the upper handle to accomplish this motion. A compression spring is preferably supplied to assist in raising the rod when downward pressure is released. The brake rod can also be abutting but unattached to the upper handle portion so that it is pushed into brake-disengagement position when the handle is straight.

SPECIFIC EXAMPLE OF INVENTION

Referring now to the drawings, there is illustrated therein a measuring wheel 10 comprising a handle made up of an elongated upper portion 11 and a shorter pivotally connected lower portion 23. The end of the handle portion 11 is inserted in a socket 12 and held by thumb screw 13. Socket 12 is part of a member 14 which has a lower socket holding extension plate 15 by screw 14a. Lower handle portion 23 is tubular and includes a pair of extension plates 17 connected by pivot pin 16 to extension plate 15. Brake rod 19 has a protuberance 20 below which is housed a compression spring 21.

Connected to the tubular section 23 is a yoke 25 having arms 26 and 27 engaging shaft 39 of the wheel 35. Brake rod 19 extends through the yoke, through a guide plate 28 and terminates in a plate 29 supporting a brake shoe 30 engageable with the rim 35a of the wheel 35.

The yoke 25 also supports bracket 31 holding a shelf 32 for the counter 33.

The counter 33 has a tongue 34 adapted to engage the cam surfaces 37 and 38 concentrically spaced on one side of the wheel 35.

Mounted on the lower handle section 23 is a slidable collar 45 having member 46 which locks the collar and pivotally supports arm 52. At the lower end of yoke 25 are mounted the arms 41 and 42 of a yoke 40 which has an elongated portion 47 pivotally connected to the other end of arm 44 by means of a pin through one of selected orifices 47a, b, c, or d. Suspended on the pin which provides the pivotal connection between the arms 52 and 47 is a chalk marking assembly 44 including chalk 50 held by plate 49 welded on one side and held on the other by means of thumb screw 51. Assembly 44 is connected by an extension spring 48 to arm 47. Sliding collar 45 can be adjusted by member 46 to position chalk assembly at a different height as may be required for persons of different height.

Also suspended from pivot rod 45a is a movable stand 43.

What is claimed is:
1. A measuring wheel comprising:
    (a) a handle comprising an elongated upper portion adapted to pivot on a shorter lower portion from straight to bent position; said lower portion having a downward extension;
    (b) a wheel having an actuating portion and having a shaft connected to said extension;
    (c) a digital counter supported by said extension and having a portion engageable with said actuating portion;
    (d) a brake shoe engageable with said wheel;
    (e) a brake rod connected to said brake shoe and extending to said upper handle portion; and
    (f) means for urging said brake rod upwardly so as to cause said brake shoe to engage said wheel, said brake rod and upper handle portion being engageable so that when the upper handle portion is in its straight position the brake shoe will be held out of engagement with the wheel.
2. The measuring wheel of claim 1 wherein said brake rod is pivotally connected to said upper handle portion.
3. The measuring wheel of claim 1 wherein said urging means includes spring means associated with said brake rod and connection of said brake rod to said brake shoe.
4. The measuring wheel of claim 3 wherein said brake rod is pivotally attached to said upper portion.
5. The measuring wheel of claim 3 wherein said lower handle portion is tubular, said brake rod extends through said lower portion, and said spring means comprises a compression spring surrounding said rod.

6. The measuring wheel of claim 1 wherein a marking device is connected to said lower portion pivotally and with a spring.

7. The measuring wheel of claim 6 wherein the marking device comprises a support suspended from the juncture of two pivotally connected arms, one of which is connected to the handle and the other to the yoke.

References Cited

UNITED STATES PATENTS

| | | | |
|---|---|---|---|
| 2,716,819 | 9/1955 | Staples | 33—141 E |
| 2,741,031 | 4/1956 | Martin et al. | 33—141 R |

LEONARD FORMAN, Primary Examiner

S. L. STEPHAN, Assistant Examiner